(12) United States Patent
Kono et al.

(10) Patent No.: US 9,911,968 B2
(45) Date of Patent: Mar. 6, 2018

(54) ELECTRODE ACTIVE MATERIAL, METHOD FOR PRODUCING SAME, ELECTRODE FOR NONAQUEOUS SECONDARY BATTERY, AND NONAQUEOUS SECONDARY BATTERY

(75) Inventors: Satoshi Kono, Osaka (JP); Mitsuhiro Kishimi, Osaka (JP); Atsushi Hatakeyama, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 321 days.

(21) Appl. No.: 13/062,488

(22) PCT Filed: Mar. 10, 2010

(86) PCT No.: PCT/JP2010/053969
§ 371 (c)(1),
(2), (4) Date: Mar. 4, 2011

(87) PCT Pub. No.: WO2010/116839
PCT Pub. Date: Oct. 14, 2010

(65) Prior Publication Data
US 2011/0171529 A1    Jul. 14, 2011

(30) Foreign Application Priority Data

Apr. 10, 2009    (JP) .................. 2009-095427
Feb. 17, 2010    (JP) .................. 2010-032831

(51) Int. Cl.
*H01M 4/525* (2010.01)
*H01M 4/505* (2010.01)
(Continued)

(52) U.S. Cl.
CPC ........... *H01M 4/131* (2013.01); *C01G 53/44* (2013.01); *C01G 53/50* (2013.01);
(Continued)

(58) Field of Classification Search
USPC .................................................. 429/223, 224
See application file for complete search history.

(56) References Cited

U.S. PATENT DOCUMENTS

| 6,416,902 B1* | 7/2002 | Miyasaka | 429/223 |
| 2002/0086210 A1* | 7/2002 | Naruoka | C01G 51/42 |
| | | | 429/223 |

(Continued)

FOREIGN PATENT DOCUMENTS

| JP | 09-231963 | * | 9/1997 | H01M 4/04 |
| | | | | 4/2 |
| JP | 9-231963 A | | 9/1997 | |

(Continued)

OTHER PUBLICATIONS

International Search Report for PCT/JP2010/053969 dated Jun. 15, 2010.

(Continued)

*Primary Examiner* — Osei K Amponsah
(74) *Attorney, Agent, or Firm* — Birch, Stewart, Kolasch & Birch, LLP

(57) ABSTRACT

An electrode active material includes particles of a lithium-containing composite oxide represented by the general compositional formula: $Li_{1+x}MO_2$, where $-0.15 \leq x \leq 0.15$, and M represents an element group of three or more elements including at least Ni, Co and Mn, wherein the ratios of Ni, Co and Mn to the total elements constituting M satisfy $45 \leq a \leq 90$, $5 \leq b \leq 30$, $5 \leq c \leq 30$ and $10 \leq b+c \leq 55$, where the ratios of Ni, Co and Mn are represented by a, b and c, respectively, in units of mol %, the average valence A of Ni in the whole particles is 2.2 to 3.2, the valence B of Ni on the surface of the particles has the relationship: B<A, the average valence C of Co in the whole particles is 2.5 to 3.2, the valence D of Co on the surface of the particles has the relationship:

(Continued)

D<C, and the average valence of Mn in the whole particles is 3.5 to 4.2.

14 Claims, 2 Drawing Sheets

(51) Int. Cl.
    *H01M 4/131* (2010.01)
    *H01M 4/88* (2006.01)
    *H01M 4/04* (2006.01)
    *H01M 4/1391* (2010.01)
    *H01M 4/485* (2010.01)
    *H01M 4/62* (2006.01)
    *H01M 10/0525* (2010.01)
    *C01G 53/00* (2006.01)

(52) U.S. Cl.
    CPC ....... *H01M 4/0471* (2013.01); *H01M 4/1391* (2013.01); *H01M 4/485* (2013.01); *H01M 4/505* (2013.01); *H01M 4/525* (2013.01); *H01M 4/626* (2013.01); *H01M 10/0525* (2013.01); *C01P 2002/52* (2013.01); *C01P 2002/54* (2013.01); *C01P 2004/32* (2013.01); *C01P 2004/61* (2013.01); *C01P 2006/11* (2013.01); *C01P 2006/12* (2013.01); *C01P 2006/40* (2013.01); *H01M 4/621* (2013.01); *H01M 4/625* (2013.01)

(56) References Cited

U.S. PATENT DOCUMENTS

| | | | |
|---|---|---|---|
| 2003/0082452 A1 | 5/2003 | Ueda et al. | |
| 2004/0110063 A1* | 6/2004 | Uchitomi | C01G 53/50 429/223 |
| 2004/0142240 A1* | 7/2004 | Nagayama | C01G 51/42 429/231.1 |
| 2005/0266315 A1* | 12/2005 | Sato | H01M 4/131 429/231.95 |
| 2007/0202405 A1* | 8/2007 | Shizuka | H01M 4/505 429/231.3 |
| 2007/0231691 A1 | 10/2007 | Abe et al. | |
| 2008/0268347 A1 | 10/2008 | Ohzuku et al. | |

FOREIGN PATENT DOCUMENTS

| | | |
|---|---|---|
| JP | 2002-151076 A | 5/2002 |
| JP | 2003-221236 A | 8/2003 |
| JP | 2006-202647 A | 8/2006 |
| JP | 2007-141527 A | 6/2007 |
| JP | 2007-273108 A | 10/2007 |
| JP | 2008-116741 A | 5/2008 |
| JP | 2008-258160 A | 10/2008 |
| JP | 2010-15959 A | 1/2010 |
| WO | WO 02/40404 A1 | 5/2002 |

OTHER PUBLICATIONS

Japanese Office Action dated Dec. 11, 2012 for Japanese Application No. 2010-529186.

Chinese Office Action dated Jan. 28, 2013 for CN Patent Application No. 201080002512.1.

Wang et et al., "Synthesis and Characteristics of Layered $LiNi_{0.8}Co_{0.1}Mn_{0.1}O_2$ Cathode Material for Lithium Rechargeable Batteries," The Chinese Journal of Process Engineering (2007), vol. 7, No. 4, pp. 818-821, with English translation.

English translation of JP-9-231963-A, published Sep. 5, 1997.

* cited by examiner

ELECTRODE ACTIVE MATERIAL, METHOD FOR PRODUCING SAME, ELECTRODE FOR NONAQUEOUS SECONDARY BATTERY, AND NONAQUEOUS SECONDARY BATTERY

TECHNICAL FIELD

The present invention relates to an electrode for a non-aqueous secondary battery having a high capacity and excellent thermal stability, an electrode active material for use in such an electrode, a method for producing such an electrode active material, and a non-aqueous secondary battery that includes such an electrode and that has a high capacity, good safety even in high temperature environments, and excellent charge/discharge cycle characteristics and storage characteristics.

BACKGROUND ART

With the development of portable electronic devices such as cell phones and notebook personal computers and the commercialization of electric vehicles in recent years, demand is increasing for small, lightweight and high capacity secondary batteries and capacitors. Currently, high capacity secondary batteries and capacitors that can fulfill the demand commonly employ $LiCoO_2$, $LiNiO_2$, $LiMn_2O_4$ and the like as positive electrode active materials.

However, these positive electrode active materials have the following drawbacks. $LiCoO_2$ has low thermal stability in the charged state. $LiNiO_2$ has a capacity higher than that of $LiCoO_2$, but is less thermally stable than $LiCoO_2$ in the charged state. Furthermore, $LiMn_2O_4$ has high thermal stability in the charged state, but has a capacity per volume smaller than that of $LiCoO_2$.

Under the circumstances, in order to achieve both thermal stability of $LiMn_2O_4$ and the high capacity of $LiNiO_2$, lithium-containing composite oxides have been proposed that has the layered crystal structure of $LiNiO_2$ and in which a certain amount of Ni has been substituted by Mn having high thermal stability (for example, Patent Documents 1 to 3).

In particular, Patent Document 3 discloses a method for producing a lithium-containing composite oxide as described above that includes a process in which raw material compounds are mixed and baked, and thereafter the mixture is washed with water and dried. According to Patent Document 3, the method removes impurities and by-products attached to the baked product obtained by baking the mixture of raw material compounds, thereby providing a lithium-containing composite oxide having excellent thermal stability.

Prior Art Documents

Patent Documents

Patent Document 1: JP 2003-221236 A
Patent Document 2: WO 02/40404A
Patent Document 3: JP 2007-273108 A

SUMMARY OF INVENTION

Problem to be Solved by the Invention

However, lithium-containing composite oxides as disclosed in Patent Documents 1 to 3 have low initial charge/discharge efficiency, and thus the capacity tends to decrease significantly. Also, the lithium-containing composite oxides have a low true density, and thus it is difficult to increase the capacity when they are used in electrodes. That is, there is still some room for improvement in terms of further increase in battery capacity, as well as in terms of battery charge/discharge cycle characteristics and storage characteristics.

The present invention has been conceived under the above-described circumstances, and provides an electrode for a non-aqueous secondary battery having a high capacity and high thermal stability, an electrode active material that can constitute such an electrode, a method for producing such an electrode active material, and a non-aqueous secondary battery that includes such an electrode and that has a high capacity, good safety even in high temperature environments, as well as excellent charge/discharge cycle characteristics and storage characteristics.

Means for Solving Problem

An electrode active material according to the present invention is an electrode active material including particles of a lithium-containing composite oxide represented by the general compositional formula: $Li_{1+x}MO_2$, where x is within a range of $-0.15 \leq x \leq 0.15$, and M represents an element group of three or more elements including at least Ni, Co and Mn, wherein the ratios of Ni, Co and Mn to the total elements constituting M satisfy $45 \leq a \leq 90$, $5 \leq b \leq 30$, $5 \leq c \leq 30$ and $10 \leq b+c \leq 55$, where the ratios of Ni, Co and Mn are represented by a, b and c, respectively, in units of mol %, the average valence A of Ni in the whole particles is 2.2 to 3.2, the valence B of Ni on the surface of the particles has the relationship: B<A, the average valence C of Co in the whole particles is 2.5 to 3.2, the valence D of Co on the surface of the particles has the relationship: D<C, and the average valence of Mn in the whole particles is 3.5 to 4.2.

An electrode for a non-aqueous secondary battery according to the present invention includes an electrode material mixture layer containing the electrode active material of the present invention.

A non-aqueous secondary battery according to the present invention is a non-aqueous secondary battery including a positive electrode, a negative electrode and a non-aqueous electrolyte, wherein the positive electrode includes an electrode material mixture layer containing the electrode active material of the present invention.

A method for producing an electrode active material according to the present invention is a method for producing an electrode active material including particles of a lithium-containing composite oxide represented by the general compositional formula: $Li_{1+x}MO_2$, where x is within a range of $-0.15 \leq x \leq 0.15$, and M represents an element group of three or more elements including at least Ni, Co and Mn, in which the ratios of Ni, Co and Mn to the total elements constituting M satisfy $45 \leq a \leq 90$, $5 \leq b \leq 30$, $5 \leq c \leq 30$ and $10 \leq b+c \leq 55$, where the ratios of Ni, Co and Mn are represented by a, b and c, respectively, in units of mol %, the average valence A of Ni in the whole particles is 2.2 to 3.2, the valence B of Ni on the surface of the particles has the relationship: B<A, the average valence C of Co in the whole particles is 2.5 to 3.2, the valence D of Co on the surface of the particles has the relationship: D<C, and the average valence of Mn in the whole particles is 3.5 to 4.2, the method including the steps of washing a composite oxide of Li and the element group M with water or an organic solvent; and heat treating the washed composite oxide at a temperature of 600 to 1000° C. in an atmosphere containing 18 vol % or more of oxygen.

Effects of the Invention

According to the present invention, it is possible to provide an electrode for a non-aqueous secondary battery having a high capacity and high thermal stability, an electrode active material that can constitute such an electrode, a method for producing such an electrode active material, and a non-aqueous secondary battery that includes such an electrode and that has a high capacity, good safety even in high temperature environments, and excellent charge/discharge cycle characteristics and storage characteristics.

MODES FOR CARRYING OUT THE INVENTION

Figure 1A:
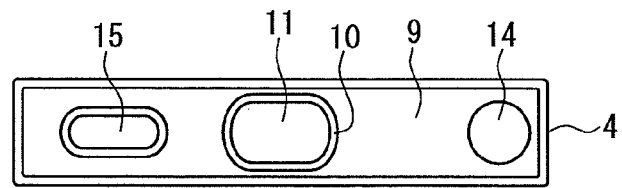
FIG. 1A is a plan view showing an example of a non-aqueous secondary battery of the present invention.

An electrode active material according to the present invention includes particles of a lithium-containing composite oxide represented by the following general compositional formula (1):

$$Li_{1+x}MO_2 \qquad (1),$$

where x is within a range of −0.15≤x≤0.15, and M represents an element group of three or more elements including at least Ni, Co and Mn. The ratios of Ni, Co and Mn to the total elements constituting M satisfy 45≤a≤90, 5≤b≤30, 5≤c≤30, and 10≤b+c≤55, where the ratios of Ni, Co and Mn are represented by a, b and c, respectively, in units of mol %. Furthermore, the average valence A of Ni in the whole particles is 2.2 to 3.2, the valence B of Ni on the surface of the particles has the relationship: B<A, the average valence C of Co in the whole particles is 2.5 to 3.2, the valence D of Co on the surface of the particles has the relationship: D<C, and the average valence of Mn in the whole particles is 3.5 to 4.2. The electrode active material of the present invention is used as a positive electrode active material for a non-aqueous secondary battery.

The lithium-containing composite oxide constituting the electrode active material of the present invention contains an element group M including at least Ni, Co and Mn. Ni is a component that contributes to improving the capacity of the lithium-containing composite oxide.

The ratio a of Ni is 45 mol % or more, and more preferably 50 mol % or more, based on the total number of elements of the element group M in the general compositional formula (1), representing the lithium-containing composite oxide, taken as 100 mol % from the viewpoint of achieving improved capacity of the lithium-containing composite oxide. However, if the ratio of Ni in the element group M is too large, for example, the amounts of Co and Mn will be small, reducing the effects of these elements. Accordingly, the ratio a of Ni is 90 mol % or less based on the total number of elements of the element group M in the general compositional formula (1), representing the lithium-containing composite oxide, taken as 100 mol %.

The electrical conductivity of the lithium-containing composite oxide decreases as the average valence of Ni in the whole particles decreases. Accordingly, in the lithium-containing composite oxide particles, the average valence A of Ni in the whole particles measured by the method described below in the following examples is 2.2 to 3.2, and more preferably 2.2 to 2.9. This enables stable synthesis even in the atmospheric air, and it is possible to obtain high capacity lithium-containing composite oxide particles having excellent productivity and thermal stability.

Also, in the lithium-containing composite oxide particles, the valence B of Ni on the surface of the particles measured by the method described below in the following examples is smaller than the average valence A of Ni in the whole particles, or in other words, has the relationship: B<A. This makes Ni on the surface of the particles inert and suppresses side reactions in the battery, and it is therefore possible to obtain a battery having excellent charge/discharge cycle characteristics and storage characteristics.

The valence B of Ni on the surface of the particles need only be smaller than the average valence A of Ni in the whole particles, but the average valence A of Ni in the whole particles can vary according to the ratio of Ni in the lithium-containing composite oxide, and thus the preferable range of the valence B of Ni on the surface of the particles varies as well according to the ratio of Ni in the lithium-containing composite oxide. For this reason, it is difficult to specify a preferred range of the valence B of Ni on the surface of the particles, but for example, in the lithium-containing composite oxide particles, the difference (A−B) between the average valence A of Ni in the whole particles and the valence B of Ni on the surface of the particles is preferably 0.05 or more, and more preferably 0.1 or more. It is thereby possible to better ensure the above-described effects obtained by providing the difference between the average valence A of Ni in the whole particles and the valence B of Ni on the surface of the particles. However, it is difficult to produce a lithium-containing composite oxide with a large difference (A−B), and thus the (A−B) value is preferably 0.5 or less, and more preferably 0.2 or less.

Co contributes to the capacity of the lithium-containing composite oxide and acts to improve the packing density in the electrode material mixture layer of the electrode having the lithium-containing composite oxide particles, but it may cause increased cost and reduced safety if the amount is too large. Accordingly, the ratio b of Co is 5 mol % or more and 30 mol % or less based on the total number of elements of the element group M in the general compositional formula (1), representing the lithium-containing composite oxide, taken as 100 mol %.

From the viewpoint of increasing the capacity of the lithium-containing composite oxide, the average valence C of Co in the whole particles of the lithium-containing composite oxide, which is measured by the method described below in the following examples, is 2.5 to 3.2.

In the lithium-containing composite oxide particles, the valence D of Co on the surface of the particles, which is measured by the method described below in the following examples, is smaller than the average valence C of Co in the whole particles, or in other words, has the relationship: D<C. As described above, when the valence of Co on the surface of the particles is smaller than the average valence of Co in the whole particles, Li sufficiently diffuses on the surface of the particles, and thus good electrochemical characteristics can be ensured, and a battery having excellent battery characteristics can be obtained.

The valence D of Co on the surface of the particles need only be smaller than the average valence C of Co in the whole particles, but the average valence C of Co in the whole particles can vary according to the ratio of Co in the lithium-containing composite oxide, and thus the preferable range of the valence D of Co on the surface of the particles varies as well according to the ratio of Co in the lithium-containing composite oxide. For this reason, it is difficult to specify a preferred range of the valence D of Co on the surface of the particles, but for example, in the lithium-containing composite oxide particles, the difference (C−D) between the average valence C of Co in the whole particles and the valence D of Co on the surface of the particles is preferably 0.05 or more, and more preferably 0.1 or more. It is thereby possible to better ensure the above-described effects obtained by providing the difference between the average valence C of Co in the whole particles and the valence D of Co on the surface of the particles. However, it is difficult to produce a lithium-containing composite oxide with a large difference (C−D), and thus the (C−D) value is preferably 0.5 or less, and more preferably 0.2 or less.

Also, in the lithium-containing composite oxide, the ratio c of Mn is 5 mol % or more and 30 mol % or less based on the total number of elements of the element group M in the general compositional formula (1) taken as 100 mol %. By including Mn in the above-described amount in the lithium-containing composite oxide so as to have Mn necessarily present in a crystal lattice, the thermal stability of the lithium-containing composite oxide particles can be increased, and it is thereby possible to obtain an even safer battery. In other words, in the crystal lattice, Mn stabilizes the layer structure together with divalent Ni, improving the thermal stability of the lithium-containing composite oxide.

Furthermore, in the lithium-containing composite oxide, inclusion of Co suppresses variations of Mn valence associated with doping and dedoping of Li during battery charge/discharge and stabilizes the average Mn valence at a value near 4, further increasing reversibility in charge/discharge. Accordingly, by using an electrode active material composed of such a lithium-containing composite oxide, it is possible to obtain a battery having excellent charge/discharge cycle characteristics.

The specific average valence of Mn in the whole particles of the lithium-containing composite oxide, which is measured by the method described below in the following examples, is 3.5 to 4.2 in order to stabilize the layer structure together with divalent Ni.

It is preferable that the valence of Mn on the surface of the particles of the lithium-containing composite oxide is equal to the average valence of Mn in the whole particles. This is because in this case, leaching of Mn, which may occur when the valence of Mn on the surface of the particles is low, can be well suppressed.

In the lithium-containing composite oxide, from the viewpoint of better ensuring the effects obtained by combined use of Co and Mn, the sum (b+c) of the ratio b of Co and the ratio c of Mn is 10 mol % or more and 55 mol % or less, and more preferably 50 mol % or less, based on the total number of elements of the element group M in the general compositional formula (1) taken as 100 mol %.

The element group M in the general compositional formula (1) representing the lithium-containing composite oxide may include an element other than Ni, Co and Mn, such as Ti, Cr, Fe, Cu, Zn, Al, Ge, Sn, Mg, Ag, Ta, Nb, B, P, Zr, Ga, W, Mo, V, Ca, Sr or Ba. Addition of an alkaline-earth metal selected from Ca, Sr and Ba, for example, promotes the growth of primary particles and improves the crystallinity of the lithium-containing composite oxide, and it is therefore possible to reduce active sites, improve the stability over time when used as a coating material, and suppress irreversible reactions with the electrolyte. To this end, it is particularly preferable to use Ba.

However, in order to obtain sufficient effects of the present invention, the ratio of the element other than Ni, Co and Mn is preferably 15 mol % or less, and more preferably 3 mol % or less based on the total number of elements of the element group M taken as 100 mol %. On the other hand, in order to easily obtain the effects of the element other than Ni, Co and Mn, the ratio of the element is preferably 0.1 mol % or more. The element other than Ni, Co and Mn of the element group M may be uniformly distributed in the lithium-containing composite oxide, or may be segregated to the particle surface or the like.

In the general compositional formula (1) representing the lithium-containing composite oxide, when the ratio b of Co and the ratio c of Mn in the element group M satisfy the relationship: b>c, the growth of the lithium-containing composite oxide particles is promoted, the packing density of the particles when used in an electrode material mixture layer is increased, lithium-containing composite oxide particles having higher reversibility can be obtained, and thereby a further increase in the capacity of the battery using such an electrode is expected.

On the other hand, in the general compositional formula (1) representing the lithium-containing composite oxide, when the ratio b of Co and the ratio c of Mn in the element group M satisfy the relationship: b≤c, a lithium-containing composite oxide having higher thermal stability can be obtained, and a further increase in the safety of the battery using such an electrode is expected.

The lithium-containing composite oxide particles having the above-described composition have a true density as large as 4.55 to 4.95 g/cm$^3$, and thus is a material having a high volume energy density. This is presumably because the true density of the lithium-containing composite oxide containing Mn within a predetermined range changes significantly according to the composition of the lithium-containing composite oxide, but when the composition is within a narrow composition range as described above, the structure is stabilized and uniformity is increased, and thus the true density takes a large value close to, for example, the true density of LiCoO$_2$. The particles have a large true density as described above, whereby the capacity of the lithium-containing composite oxide per mass can be increased, and a material having excellent reversibility can be obtained.

The lithium-containing composite oxide has a large true density particularly when it has a composition close to the stoichiometric ratio. Specifically, in the general compositional formula (1), x preferably is within the range of −0.15≤x≤0.15, and by adjusting the value of x within this range, increased true density and reversibility can be obtained. More preferably, x is −0.05 or more and 0.05 or less. In this case, the lithium-containing composite oxide can have a true density as high as 4.6 g/cm$^3$ or more.

The lithium-containing composite oxide constituting the electrode active material of the present invention is preferably a composite oxide represented by the following general compositional formula (2):

$$Li_{1+x}Ni_{1-d-e}Co_dMn_eO_2 \qquad (2),$$

where −0.15≤x≤0.15, 0.05≤d≤0.3, 0.05≤e≤0.3, and 0.1≤d+e≤0.55. It is preferable that d+e is 0.5 or less.

In the lithium-containing composite oxide particles, it is preferable that the ratio of primary particles having a particle size of 1 μm or less to the total primary particles of the lithium-containing composite oxide particles is preferably 30 vol % or less, and more preferably 15 vol % or less. The lithium-containing composite oxide particles preferably has a BET specific surface area of 0.3 m²/g or less, and more preferably 0.25 m²/g or less. When the lithium-containing composite oxide particles have such a configuration, the surface activity of the particles can be optimally suppressed, and when the particles are used as a positive electrode active material in a battery, the generation of gas can be suppressed, and particularly when the battery has a prismatic outer case, deformation of the outer case can be suppressed, further improving the storage properties and the service life.

In other words, in the lithium-containing composite oxide particles, if the ratio of primary particles having a particle size of 1 μm or less to the total primary particles is too large, or if the BET specific surface area is too large, the reaction area will be large, increasing the number of active sites, and thus easily causing irreversible reactions with water in the atmospheric air, with the binder used to form an electrode material mixture layer using the lithium-containing composite oxide particles as an active material, or with the non-aqueous electrolyte in the battery having the electrode, as a result of which problems are likely to occur such as the outer case being deformed due to gas generated within the battery, and the composition (paste, slurry or the like) containing a solvent used to form the electrode material mixture layer being gelled.

The lithium-containing composite oxide particles may contain no primary particles having a particle size of 1 μm or less. In other words, the ratio of primary particles having a particle size of 1 μm or less may be 0 vol %. The BET specific surface area of the lithium-containing composite oxide particles is preferably 0.1 m²/g or more in order to prevent the reactivity from decreasing more than necessary. Furthermore, the lithium-containing composite oxide particles preferably have a number average particle size of 5 to 25 μm.

The ratio of primary particles having a particle size of 1 μm or less contained in the lithium-containing composite oxide particles, the number average particle size of the lithium-containing composite oxide particles and the number average particle size of another active material, which will be described later, can be measured by using a laser diffraction/scattering particle size distribution analyzer such as Microtrac HRA available from Nikkiso Co. Ltd. The BET specific surface area of the lithium-containing composite oxide particles is a specific surface area of micropores and active material surface obtained by measuring the surface area and performing calculation by the BET method, which is a theory for multilayer adsorption. Specifically, the BET specific surface area is a value obtained using a specific surface area measuring apparatus that uses nitrogen adsorption method (Macsorb HM model-1201 available from Mountech Co., Ltd.) as a BET specific surface area.

From the viewpoint of increasing the density of the electrode material mixture layer included in the electrode that uses the lithium-containing composite oxide particles as an active material to increase the electrode capacity and hence the battery capacity, the lithium-containing composite oxide particles preferably have a spherical shape or a substantially spherical shape. With this configuration, in a pressing step when producing an electrode, details of which will be described later, when the lithium-containing composite oxide particles are moved by pressing so as to increase the density of the electrode material mixture layer, the particles are effortlessly moved and smoothly reoriented. It is therefore possible to reduce the pressing load, reducing damage to the current collector caused by pressing, thus increasing the electrode productivity. The lithium-containing composite oxide particles, when having a spherical shape or a substantially spherical shape, can withstand a larger pressing pressure, and thus the electrode material mixture layer can be made highly dense.

Furthermore, from the viewpoint of increasing the electrode material mixture layer filling ability of the lithium-containing composite oxide particles in the electrode using the lithium-containing composite oxide particles, the lithium-containing composite oxide particles preferably have a tap density of 2.4 g/cm³ or more, more preferably 2.8 g/cm³ or more, and also preferably 3.8 g/cm³ or less. In other words, the filling ability of the lithium-containing composite oxide in the electrode material mixture layer can be increased by making particles having a high tap density and having no pores inside the particles or having a small porosity with a surface area ratio of micropores of 1 μm or less of 10% or less, measured by observing the particle's cross section.

The tap density of the lithium-containing composite oxide particles is a value determined through the following measurement using Powder Tester Model PT-S available from Hosokawa Micron Corporation. Firstly, particles are filled and leveled off in a 100-cm³ measurement cup, and tapped for 180 seconds while compensating for a volume loss as appropriate. After completion of tapping, excess particles are leveled off with a blade, thereafter, mass W (g) is measured and tap density is determined by the following equation:

Tap density=$W$/100.

The electrode active material (lithium-containing composite oxide particles) of the present invention is produced by a production method of the present invention including the steps of washing a composite oxide of Li and the element group M and heat treating the washed composite oxide in an oxygen-containing atmosphere. In other words, with the production method of the present invention described below, it is possible to produce an electrode active material of the present invention composed of lithium-containing composite oxide particles having the above-described composition and the valence of each element, and the above-described true density and tap density, as well as various factors (the ratio of primary particles having a particle size of 1 μm or less, the BET specific surface area, the number average particle size, and the shape).

The technique in which a baked lithium-containing composite oxide is washed and heat-treated (including drying) to remove impurities and the like contained in the baked product so as to improve the characteristics of the lithium-containing composite oxide is conventionally known as disclosed in, for example, Patent Document 3. However, with the production method of the present invention, the final product of lithium-containing composite oxide contains a relatively large amount of Mn, and the processing conditions (heat treatment conditions in particular) are optimized, as a result of which in addition to removing the impurities, the valences of Ni and Co on the surface of the particles of the lithium-containing composite oxide are controlled to be smaller than the average valences thereof in the whole particles, enabling the production of lithium-containing composite oxide particles having high electrochemical characteristics and serving as an active material capable of suppressing side reactions in the battery.

The composite oxide of Li and the element group M that is used to produce the lithium-containing composite oxide particles is obtained by baking a raw material compound containing Li and the element group M. It is very difficult to obtain a highly pure composite oxide of Li and the element group M by simply mixing and baking a Li-containing compound, a Ni-containing compound, a Co-containing compound and a Mn-containing compound. This is presumably because it is difficult to uniformly disperse Ni, Co and Mn during synthesis reaction of the lithium-containing composite oxide as they have a low diffusion speed in solid, making it difficult to uniformly disperse Ni, Co and Mn in the produced lithium-containing composite oxide.

To address this, when synthesizing the composite oxide of Li and the element group M, it is preferable to employ a method in which a composite compound containing at least Ni, Co and Mn as constituent elements and a Li-containing compound are baked. With this method, highly pure lithium-containing composite oxide particles are synthesized relatively easily. Specifically, a composite compound containing Ni, Co and Mn is synthesized first, and the composite compound is baked together with a Li-containing compound, thereby Ni, Co and Mn are uniformly distributed during the oxide forming reaction, and a highly pure composite oxide of Li and the element group M is synthesized.

The method for synthesizing a composite oxide of Li and the element group M is not limited to the method described above, but it is surmised that the physical properties of the final product of lithium-containing composite oxide, or in other words, the stability of the structure, the reversibility in charge/discharge, the true density and the like, change significantly depending on through which process the composite oxide was synthesized.

Examples of the composite compound containing at least Ni, Co and Mn include a coprecipitated compound, a hydrothermally synthesized compound and a mechanically synthesized compound that contain at least Ni, Co and Mn, and a compound obtained by heat treating any of these compounds, and it is preferable to use an oxide or hydroxide of Ni, Co and Mn such as $Ni_{0.6}Co_{0.2}Mn_{0.2}O$, $Ni_{0.6}Co_{0.2}Mn_{0.2}(OH)_2$, or $Ni_{0.6}Co_{0.3}Mn_{0.1}(OH)_2$.

In the case of producing a lithium-containing composite oxide containing an element other than Ni, Co and Mn as a part of the element group M (for example, at least one element selected from the group consisting of Ti, Cr, Fe, Cu, Zn, Al, Ge, Sn, Mg, Ag, Ta, Nb, B, P, Zr, Ga, W, Mo, V, Ca, Sr and Ba, which are hereinafter collectively referred to as an "element M'"), the lithium-containing composite oxide can be synthesized by mixing and baking a composite compound containing at least Ni, Co and Mn, a Li-containing compound and an element M'-containing compound, but it is preferable to use a composite compound containing at least Ni, Co, Mn and the element M' instead of the composite compound containing at least Ni, Co and Mn and the element M'-containing compound. The amount ratios of Ni, Co, Mn and M' in the composite compound may be adjusted as appropriate according to the intended composition of the lithium-containing composite oxide.

As the Li-containing compound that can be used to synthesize the composite oxide of Li and the element group M, various lithium salts can be used. Examples include lithium hydroxide monohydrate, lithium nitrate, lithium carbonate, lithium acetate, lithium bromide, lithium chloride, lithium citrate, lithium fluoride, lithium iodide, lithium lactate, lithium oxalate, lithium phosphate, lithium pyruvate, lithium sulfate, and lithium oxide. Among them, it is preferable to use lithium hydroxide monohydrate because it does not generate emissions that cause harm to the environment such as carbon dioxide, nitrogen oxides or sulfur oxides.

To synthesize the composite oxide of Li and the element group M, firstly, a composite compound containing at least Ni, Co and Mn (the composite compound may further contain the element M'), a Li-containing compound and optionally an element M'-containing compound are mixed at a ratio substantially equal to the intended composition of the lithium-containing composite oxide. In order to obtain the final product of lithium-containing composite oxide particles having a composition close to the stoichiometric ratio, it is preferable to adjust the mixing ratio of the Li-containing compound to the other raw material compounds such that the amount of Li contained in the Li-containing compound is in excess of the total amount of the element group M. The obtained raw material mixture is then baked at, for example, 800 to 1050° C. for 1 to 24 hours, and thereby a composite oxide of Li and the element group M can be obtained.

When baking the raw material mixture, it is preferable to, rather than increasing the temperature to a certain temperature at a time, temporarily heat the raw material mixture to a temperature (for example, 250 to 850° C.) lower than the baking temperature, maintain the temperature for preheating, and then increase the temperature to the baking temperature to proceed the reaction. It is also preferable to maintain the oxygen concentration in the baking environment at a constant level.

This is performed to increase the uniformity of the generated composite oxide of Li and the element group M and to grow the crystal of the produced composite oxide of Li and the element group M in a stable manner by causing a composite compound containing at least Ni, Co and Mn (the composite compound may further contain the element M'), a Li-containing compound and optionally an element M'-containing compound to react stepwise because the composition can be easily transformed to a non-stoichiometric composition in the production process of the composite oxide of Li and the element group M due to trivalent Ni, which is unstable. In other words, when the temperature is increased to the baking temperature at a time, or when the oxygen concentration in the baking atmosphere decreases in the course of baking, the compositional uniformity is likely to be compromised: for example, the composite compound containing at least Ni, Co and Mn (the composite compound may further contain the element M'), the Li-containing compound and optionally the element M'-containing compound are likely to react non-uniformly, and the produced composite oxide of Li and the element group M may easily release Li.

There is no particular limitation on the preheating time, but the preheating time is usually approximately 0.5 to 30 hours.

The atmosphere used to bake the raw material mixture can be an oxygen-containing atmosphere (or in other words, in the atmospheric air), a mixed atmosphere of an inert gas (argon, helium, nitrogen or the like) and an oxygen gas, an oxygen gas atmosphere, or the like. In this case, the oxygen concentration is preferably 15 vol % or more, and more preferably 18 vol % or more. However, from the viewpoint of increasing the productivity of the particles and hence the productivity of the electrode while reducing the production cost of the lithium-containing composite oxide particles, the raw material mixture is preferably baked in an atmospheric air flow.

The gas flow rate used to bake the raw material mixture is preferably 2 $dm^3$/min or more per 100 g of the mixture. If the gas flow rate is too low, or in other words, if the gas flow speed is too slow, the compositional uniformity of the composite oxide of Li and the element group M may be compromised. The gas flow rate used to bake the raw material mixture is preferably 5 dm³/min or less per 100 g of the mixture.

In the step of baking the raw material mixture, a dry-mixed mixture may be used, but it is preferable to use a mixture obtained by dispersing the raw material mixture in a solvent such as ethanol to prepare a slurry, mixing the slurry with a planetary ball mill or the like for approximately 30 to 60 minutes, and drying the slurry. With this method, the uniformity of the synthesized composite oxide of Li and the element group M can be further increased.

Next, the obtained composite oxide of Li and the element group M is washed. This washing step removes impurities and by-products contained in the composite oxide of Li and the element group M. Water or an organic solvent can be used to wash the composite oxide of Li and the element group M. Examples of the organic solvent include alcohols such as methanol, ethanol, isopropanol and ethylene glycol; ketones such as acetone and methyl ethyl ketone; ethers such as diethyl ether, ethyl propyl ether, diisopropylether, dimethoxyethane, diethoxyethane, trimethoxymethane, tetrahydrofuran, 2-methyltetrahydrofuran, tetrahydrofuran derivatives, γ-butyrolactone, dioxolane, dioxolane derivatives and 3-methyl-2-oxazolidinone; esters such as methyl formate, ethyl formate, methyl acetate, ethyl acetate and phosphoric triester; and aprotic organic solvents such as N-methyl-2-pyrrolidone (NMP), ethylene carbonate (EC), propylene carbonate (PC), butylene carbonate (BC), dimethyl carbonate (DMC), diethyl carbonate (DEC), methyl ethyl carbonate (MEC), propylene carbonate derivatives, dimethyl sulfoxide, formamide, dimethylformamide, acetonitrile, nitromethane, sulfolane and 1,3-propane sultone. It is also possible to use an aminimide-based organic solvent, a sulfur-containing organic solvent, a fluorine-containing organic solvent, and the like. Water and the organic solvents listed above may be used alone or in a combination of two or more.

Furthermore, water and the organic solvent used for washing may contain an additive, examples of which include celluloses such as carboxymethyl cellulose, carboxy methyl ethyl cellulose, methyl cellulose, ethyl cellulose and hydroxypropyl cellulose; saccharides or oligomers thereof polyacrylic acid-based resins such as polyacrylic acid, polyacrylic acid derivatives (sodium polyacrylate and the like) and acrylic acid-maleic acid copolymer sodium; polyacrylic acid-based rubbers such as polyacrylic acid esters; fluorine-based resins such as polyvinylidene fluoride, polytetrafluoroethylene and polyhexafluoropropylene; and surfactants such as alkyl polyoxyethylene sulfates, alkyl benzene sulfates, alkyl trimethyl ammonium salts, alkyl benzyldimethyl ammonium salts, alkyl dimethylamine oxide, polyoxyethylene alkyl ethers and fatty acid sorbitan esters. These additives are decomposed and polymerized in the heat treating step performed after the washing step, and thus they can be used to control the surface of the lithium-containing composite oxide. Also, an acid or alkali may be added to the water or organic solvent used for washing. In this case, it is possible to obtain a more functional material that contributes to control of processing conditions as well as to reactions such as decomposition and polymerization of the additive.

It is preferable to pulverize the baked composite oxide of Li and the element group M prior to washing.

Next, the washed composite oxide of Li and the element group M is subjected to a heat treatment. The heat treatment causes the transition metals within the composite oxide to be reoriented and allows the diffusion of Li within the composite oxide to proceed, thereby stabilizing the valences of the transition metals present in the whole composite oxide particles and on the surface thereof.

In order to facilitate the diffusion of Li, the heat treatment temperature is preferably 600° C. or more at which the Li-containing compound (for example, lithium carbonate) melts. Also, in order to prevent the decomposition reaction of the composite oxide, the heat treatment temperature is preferably 1000° C. or less. The heat treatment time is preferably 1 to 24 hours. The heat treatment atmosphere is preferably an atmosphere with an oxygen concentration of 18 vol % or more, and the heat treatment may be performed in an atmosphere with an oxygen concentration of 100 vol %.

The above-described production method of the present invention enables stable production of lithium-containing composite oxide particles that have a capacity of 150 mAh/g or more (relative to Li metal, in the case of the driving voltage being 2.5 to 4.3 V) and that can constitute a battery having excellent charge/discharge cycle characteristics and storage characteristics.

The electrode for a non-aqueous secondary battery of the present invention has an electrode material mixture layer using the electrode active material (lithium-containing composite oxide particles) of the present invention as an active material, and is used as a positive electrode of a non-aqueous secondary battery.

The electrode material mixture layer included in the electrode of the present invention may contain an active material other than the electrode active material of the present invention. Examples of the active material other than the electrode active material of the present invention include lithium cobalt oxides such as $LiCoO_2$; lithium manganese oxides such as $LiMnO_2$ and $Li_2MnO_3$; lithium nickel oxides such as $LiNiO_2$; layer-structured lithium-containing composite oxides such as $LiCo_{1-x}NiO_2$; spinel-structured lithium-containing composite oxides such as $LiMn_2O_4$ and $Li_{4/3}Ti_{5/3}O_4$; olivine-structured lithium-containing composite oxides such as $LiFePO_4$; and the above-listed oxides partially substituted with various elements. In the case of using another active material, in order to clarify the effects of the present invention, the ratio of the other active material is desirably 30 mass % or less of the entire active material.

As the lithium cobalt oxide used as another active material, it is preferable to use, in addition to $LiCoO_2$ mentioned above, oxides obtained by substituting a part of Co of $LiCoO_2$ with at least one element selected from the group consisting of Ti, Cr, Fe, Ni, Mn, Cu, Zn, Al, Ge, Sn, Mg and Zr (excluding the lithium-containing composite oxide constituting the electrode active material of the present invention). The reason for this is that these lithium cobalt oxides have a high conductivity of $1.0 \times 10^{-3}$ S·cm⁻¹ or more and can further increase the load characteristics of the electrode.

As the spinel-structured lithium-containing composite oxide used as another active material, in addition to $LiMn_2O_4$ and $L_{4/3}Ti_{5/3}O_4$ mentioned above, it is preferable to use oxides obtained by substituting a part of Mn of $LiMn_2O_4$ with at least one element selected from the group consisting of Ti, Cr, Fe, Ni, Co, Cu, Zn, Al, Ge, Sn, Mg and Zr (excluding the lithium-containing composite oxide constituting the electrode active material of the present invention). The reason for this is that these spinel-structured lithium-containing composite oxides are excellent in terms of safety during overcharge and the like, further increasing the battery safety, because the amount of lithium that can be extracted is ½ that of lithium-containing oxides such as lithium cobalt oxide and lithium nickel oxide.

In the case where the electrode active material of the present invention is used together with another active material, they may be simply mixed, but it is more preferable to use the active materials as composite particles by integrating the particles of the active materials through granulation or the like. In this case, the packing density of the active materials in the electrode material mixture layer is improved, and the contact between active material particles can be further ensured. Accordingly, the capacity and the load characteristics of the non-aqueous secondary battery using the electrode can be further increased.

In the case of using the lithium-containing composite oxide contained in the electrode active material of the present invention that necessarily includes Mn as composite particles, the lithium-containing cobalt oxide is present on the surface of the lithium-containing composite oxide, and thus Mn and Co leached from the composite particles rapidly deposit on the surface of the composite particles, forming a coating film, and chemically stabilizing the composite particles. This suppresses decomposition of the non-aqueous electrolyte in the non-aqueous secondary battery due to the composite particles, as well as further leaching of Mn, and it is therefore possible to obtain a battery having excellent charge/discharge cycle characteristics and storage characteristics.

When the composite particles are used, it is preferable that the number average particle size of either one of the electrode active material of the present invention or another active material is ½ or less the number average particle size of the other. In the case of forming the composite particles by combining particles having a large number average particle size (hereinafter referred to as "large particles") and particles having a small number average particle size (hereinafter referred to as "small particles") as described above, the small particles are easily dispersed and fixed around the large particles, and thus composite particles having a more uniform mixing ratio can be formed. Accordingly, non-uniform reactions in the electrode can be suppressed, further increasing the charge/discharge cycle characteristics and the safety of the battery.

When forming the composite particles using large particles and small particles, the large particles preferably have a number average particle size of 10 to 30 μm, and the small particles preferably have a number average particle size of 1 to 15 μm.

The composite particles of the electrode active material of the present invention and another active material can be obtained by, for example, mixing the particles of the electrode active material of the present invention and the particles of the other active material with a commonly-used kneader such as a uniaxial kneader or a biaxial kneader to rub the particles together, and applying a shear force to composite the particles. Kneading is preferably performed by a continuous kneading method that continuously supplies raw material, in consideration of the productivity of the composite particles.

It is preferable to add a binder to these active material particles when kneading. It is thereby possible to well keep the shape of the formed composite particles. It is more preferable to add a conductive aid material when kneading. It is thereby possible to further increase the conductivity between active material particles.

As the binder that is added when the composite particles are produced, any of thermoplastic resins and thermosetting resins can be used as long as it is chemically stable within the non-aqueous secondary battery. Examples include polyethylene, polypropylene, polytetrafluoroethylene (PTFE), polyvinylidene fluoride (PVDF), polyhexafluoropropylene (PHFP), styrene butadiene rubber, tetrafluoroethylene-hexafluoroethylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE resin), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethylvinyl ether-tetrafluoroethylene copolymers or ethylene-acrylic acid copolymers, ethylene-methacrylic acid copolymers, ethylene-methyl acrylate copolymers, ethylene-methyl methacrylate copolymers, and Na ion crosslinked structures of these copolymers. These may be used alone or in a combination of two or more. Among them, it is preferable to use PVDF, PTFE and PHFP in consideration of the stability in the non-aqueous secondary battery and the characteristics of the non-aqueous secondary battery. These may be used in combination, or copolymers formed by these monomers may be used.

The amount of the binder added when forming the composite particles is preferably as small as possible as long as it is possible to stabilize the composite particles, and for example, the amount of the binder is preferably 0.03 to 2 parts by mass based on 100 parts by mass of the total active materials.

As the conductive aid material added when the composite particles are produced, any material can be used as long as it is chemically stable within the non-aqueous secondary battery. Examples include: graphites such as natural graphite and artificial graphite; carbon blacks such as acetylene black, Ketjen Black (trade name), channel black, furnace black, lamp black and thermal black; conductive fibers such as carbon fiber and metal fiber; metal powders such as aluminum powder; fluorinated carbon; zinc oxide; conductive whisker made of potassium titanate or the like; conductive metal oxides such as titanium oxide; and organic conductive materials such as polyphenylene derivatives. These may be used alone or m a combination two or more. Among them, it is preferable to use graphites, which have a high conductivity or carbon blacks, which have excellent liquid absorbing capabilities. The form of the conductive aid material is not limited to primary particles, and it is also possible to use secondary aggregates or clusters such as chain structures. Such clusters are easy to handle, and thus good productivity is obtained.

The amount of the conductive aid material added when forming the composite particles can be any amount as long as good conductivity and liquid absorbing capabilities can be ensured, and for example, the amount of the conductive aid material is preferably 0.1 to 2 parts by mass based on 100 parts by mass of the total active materials.

The composite particles preferably have a porosity of 5 to 15%. The composite particles having such a porosity can be brought into optimal contact with the non-aqueous electrolyte (non-aqueous electrolytic solution), and the non-aqueous electrolyte can optimally permeate into the composite particles.

Furthermore, the composite particles preferably have a spherical shape or a substantially spherical shape as in the case of the lithium-containing composite oxide particles of the electrode active material of the present invention. It is thereby possible to further increase the density of the electrode material mixture layer.

The electrode of the present invention can be produced by, for example, forming an electrode material mixture layer containing the electrode active material or the composite particles of the present invention as an active material on one or both sides of a current collector.

The electrode material. mixture layer can be formed by, for example, preparing an electrode material mixture-containing composition in the form of a paste or a slurry by adding the electrode active material or the composite particles of the present invention, a binder and a conductive aid material to a solvent, and applying the electrode material mixture-containing composition onto the surface of a current collector by any application method, drying and pressing the current collector to adjust the thickness and the density of the electrode material mixture layer.

The application method used to apply the electrode material mixture-containing composition onto the surface of a current collector can be, for example, a substrate withdrawing method using a doctor blade, a coater method using a die coater, a comma coater, a knife coater or the like, a printing method such as screen printing or relief printing.

As the binder and the conductive aid material that can be used to prepare the electrode material mixture-containing composition, any of various binders and various conductive aid materials listed above used to form the composite particles can be used.

The electrode material mixture layer preferably contains 80 to 99 mass % of active materials including the electrode active material of the present invention, (15 to 10 mass % of a binder (including the binder contained in the composite particles), and 0.5 to 10 mass % of a conductive aid material (including the conductive aid material contained in the composite particles).

It is preferable that the electrode material mixture layer formed on one side of a current collector has a thickness after pressing of 15 to 200 μm. Furthermore, the electrode material mixture layer preferably has a density after pressing of 3.2 g/cm$^3$ or more, and more preferably 3.5 g/cm$^3$ or more. With an electrode including such an electrode material mixture layer having a high density, a high capacity can be achieved. However, if the density of the electrode material mixture layer is too high, the porosity will be low, and the permeability of the non-aqueous electrolyte may decrease. Accordingly, the electrode material mixture layer preferably has a density after pressing of 3.8 g/cm$^3$ or less. Pressing can be performed by, for example, roll pressing at a line pressure of approximately 1 to 100 kN/cm. Through this process, an electrode material mixture layer having the above-described density can be obtained.

The density of the electrode material mixture layer as used herein refers to a value measured by the following method. Firstly, the electrode is cut into a piece having a certain area, the mass of the piece is measured using an electrobalance with a minimum scale value of 0.1 mg, and the mass of the electrode material mixture layer is calculated by subtracting the mass of the current collector from the mass of the electrode piece. Meanwhile, the total thickness of the electrode is measured at ten points using a micrometer with a minimum scale value of 1 μm, and the volume of the electrode material mixture layer is calculated from the area and the average of values obtained by subtracting the current collector thickness from these measured values. Then, the density of the electrode material mixture layer is calculated by dividing the mass of the electrode material mixture layer by the volume.

There is no particular limitation on the material of the current collector used in the electrode as long as an electronic conductor that is chemically stable in the formed non-aqueous secondary battery is used. Examples include aluminum, an aluminum alloy, stainless steel, nickel, titanium, carbon, and a conductive resin. It is also possible to use a composite material in which a carbon layer or a titanium layer is formed on the surface of aluminum, an aluminum alloy or stainless steel. Among them, it is particularly preferable to use aluminum or an aluminum alloy because these materials are lightweight and have high electron conductivity. As the electrode current collector, for example, a foil, a film, a sheet, a net, a punched sheet, a lath, a porous sheet, a foam, and a molded article formed of fiber bundle that are made of any of the above-listed materials can be used. It is also possible to roughen the current collector surface by surface treatment. There is no particular limitation on the thickness of the current collector, but the thickness is usually 1 to 500 μm.

The electrode of the present invention is not limited to the electrode produced by the above production method, and may be an electrode produced by other methods. The electrode of the present invention can be, for example, in the case of using the composite particles as an active material, an electrode obtained by a method in which the composite particles are directly fixed to the current collector surface to form an electrode material mixture layer, without using the electrode material mixture-containing composition.

In the electrode of the present invention, a lead connector for electrically connecting to other members within the non-aqueous secondary battery may be formed by a conventional method as needed.

The non-aqueous secondary battery of the present invention includes the electrode for a non-aqueous secondary battery of the present invention as a positive electrode. There is no particular limitation on the configuration and the structure of other elements, and conventionally known configuration and structure employed in non-aqueous secondary batteries can be used.

As the negative electrode, a negative electrode having, for example, a negative electrode material mixture layer made of a negative electrode material mixture containing a negative electrode active material, a binder and optionally a conductive aid material on one or both sides of a current collector can be used.

Examples of the negative electrode active material include graphite, pyrolytic carbon, coke, glassy carbon, baked products of organic polymer compounds, mesocarbon microbeads, carbon fiber, activated carbon, metals capable of being alloyed with lithium (Si, Sn and the like), and alloys thereof. As the binder and the conductive aid material, any of the binders and conductive aid materials listed above for use in the electrode of the present invention can be used.

There is no particular limitation on the material of the negative electrode current collector as long as an electronic conductor that is chemically stable in the formed battery is used. Examples include copper, a copper alloy, stainless steel, nickel, titanium, carbon, and a conductive resin. It is also possible to use a composite material in which a carbon layer or a titanium layer is formed on the surface of copper, a copper alloy or stainless steel. Among them, it is particularly preferable to use copper or a copper alloy because these materials are not alloyed with lithium and have high electron conductivity. As the negative electrode current collector, for example, a foil, a film, a sheet, a net, a punched sheet, a lath, a porous sheet, a foam, and a molded article formed of fiber bundle that are made of any of the above-listed materials can be used. It is also possible to roughen the current collector surface by surface treatment. There is no particular limitation on the thickness of the current collector, but the thickness is usually 1 to 500 µm.

The negative electrode can be obtained by, for example, applying a negative electrode material mixture-containing composition in the form of a paste or a slurry obtained by dispersing a negative electrode material mixture containing a negative electrode active material, a binder and optionally a conductive aid material in a solvent (the binder may be dissolved in the solvent) on one or both sides of a current collector, and drying the current collector so as to form a negative electrode material mixture layer. The negative electrode is not limited to the negative electrode obtained by the above-described production method, and may be a negative electrode produced by other methods. The negative electrode material mixture layer formed on one side of the current collector is preferably 10 to 300 µm.

The separator is preferably a porous film formed of a polyolefin such as polyethylene, polypropylene or ethylene-propylene copolymer, a polyester such as polyethylene terephthalate or copolymerized polyester, or the like. The separator preferably has a property that closes the pores at 100 to 140° C. (or in other words, a shutdown function). Accordingly, it is more preferable that the separator contains, as a component, a thermoplastic resin having a melting point of 100 to 140° C., measured using a differential scanning calorimeter (DSC) in accordance with Japanese Industrial Standard (JIS) K 7121, and the separator is preferably a monolayer porous film containing polyethylene as a main component, or a laminated porous film constituted of porous films such as a laminated porous film in which two to five layers made of polyethylene and polypropylene are laminated. In the case of mixing polyethylene with a resin having a melting point higher than that of a polyethylene such as polypropylene, or laminating these, it is desirable to use 30 mass % or more of polyethylene, and more desirably 50 mass % or more as the resin that constitutes the porous film.

As the resin porous film, for example, it is possible to use a porous film made of any of the above-listed thermoplastic resins used in conventionally known non-aqueous secondary batteries and the like, or in other words, an ion permeable porous film produced by a solvent extraction method, a dry or wet drawing method, or the like.

The separator preferably has an average pore size of 0.01 µm or more, and more preferably 0.05 µm or more, and preferably 1 µm or less, and more preferably 0.5 µm or less.

As the characteristics of the separator, it is desirable that the separator has a Gurley value of 10 to 500 sec, measured by the method in accordance with JIS P 8117, the Gurley value indicating the time, expressed in seconds, required for 100 mL of air to pass through a film under pressure of 0.879 g/mm². If the air permeability is too high, the ion permeability will be reduced. If, on the other hand, the permeability is too low, the strength of the separator may be reduced. Furthermore, as the strength of the separator, it is desirable that the separator has a piercing strength of 50 g or more, measured using a needle with a diameter of 1 mm. If the piercing strength is too small, short-circuiting may occur due to the separator being penetrated and broken by formation of lithium dendrite crystals.

Even if the internal temperature of the non-aqueous secondary battery reaches 150° C. or more, the lithium-containing composite oxide particles included in the electrode active material of the present invention have excellent thermal stability, and thus safety can be maintained.

As the non-aqueous electrolyte, a solution (non-aqueous electrolytic solution) in which an electrolyte salt is dissolved in an organic solvent can be used. Examples of the solvent include EC, PC, BC, DMC, DEC, MEC, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric triester, trimethoxymethane, a dioxolane derivative, sulfolane, 3-methyl-2-oxazolidinone, a propylene carbonate derivative, a tetrahydrofuran derivative, diethyl ether, and an aprotic organic solvent such as 1,3-propane sultone. These may be used alone or in a combination of two or more. It is also possible to use an aminimide-based organic solvent, a sulfur-containing organic solvent, a fluorine-containing organic solvent, or the like. Among them, it is preferable to use a solvent mixture of EC, MEC and DEC. In this case, it is more preferable that DEC is contained in an amount of 15 vol % or more and 80 vol % or less based on the total volume of the solvent mixture. This is because with such a solvent mixture, it is possible to maintain the low-temperature characteristics and the charge/discharge cycle characteristics of the battery at high levels, and enhance the stability of the solvent during high-voltage charging.

As the electrolyte salt used in the non-aqueous electrolyte described above, a lithium perchlorate, an organic boron lithium salt, a salt of a fluorine-containing compound such as trifluoromethane sulfonate, an imide salt, or the like is suitably used. Specific examples of the electrolyte salt include $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($2 \leq n \leq 7$), and $LiN(Rf_3OSO_2)_2$, where Rf represents a fluoroalkyl group. These may be used alone or in a combination of two or more. Among them, it is more preferable to use $LiPF_6$, $LiBF_4$, or the like because they provide good charge/discharge characteristics. This is because these fluorine-containing organic lithium salts are easily soluble in the above-listed solvents as they have a high anionic character and easily undergo ion separation. There is no particular limitation on the concentration of the electrolyte salt in the solvent, and the concentration is 0.5 to 1.7 mol/L.

It is also possible to add an additive to the non-aqueous electrolyte as appropriate such as vinylene carbonate, 1,3-propane sultone, diphenyl disulfide, cyclohexyl benzene, biphenyl, fluorobenzene, or t-butyl benzene, for the purpose of improving the characteristics such as safety, charge/discharge cycle characteristics, and high temperature storage characteristics. It is particularly preferable to add an additive containing the element sulfur because the surface activity of the active material containing Mn can be stabilized.

The non-aqueous secondary battery of the present invention is formed by, for example, producing a laminate electrode assembly in which the electrode of the present invention and a negative electrode as described above are laminated with a separator as described above interposed therebetween or a wound electrode assembly obtained by spirally winding the laminate electrode assembly, and enclosing the electrode assembly and a non-aqueous electrolyte as described above in an outer case by a conventional method. As the form of the battery, as in the case of conventionally known non-aqueous secondary batteries, the battery can be a cylindrical battery using a cylindrical (circular cylinder or rectangular cylinder) outer case can, a flat battery using a flat (flat circle or flat rectangular as viewed from above) outer case can, a soft package battery using a laminated film having a metal deposited thereon as an outer case. As the outer case can, a steel or aluminum may be used.

EXAMPLES

Hereinafter, the present invention will be described in detail by way of examples. It should be noted, however, that the examples given below are not intended to limit the present invention.

Example 1

Production of Electrode Active Material

A coprecipitated compound (spherical coprecipitated compound) containing Ni, Co and Mn was synthesized by placing, in a reaction vessel, ammonia water having a pH adjusted to approximately 12 by addition of sodium hydroxide, and then, while strongly stirring, adding dropwise a mixed aqueous solution containing nickel sulfate, cobalt sulfate and manganese sulfate at concentrations of 2.4 mol/dm$^3$, 0.8 mol/dm$^3$ and 0.8 mol/dm$^3$, and 25 mass % of ammonia water at rates of 23 cm$^3$/min and 6.6 cm$^3$/min, respectively, using a metering pump. At this time, the temperature of the reactant solution was held at 50° C., an aqueous solution of sodium hydroxide having a concentration of 6.4 mol/dm$^3$ was also added dropwise such that the pH of the reactant solution was maintained at around 12, and a nitrogen gas was bubbled at a flow rate of 1 dm$^3$/min in order to carry out the reaction in an inert atmosphere.

The synthesized coprecipitated compound was washed with water, filtrated and dried to obtain a hydroxide containing Ni, Co and Mn at a molar ratio of 6:2:2. The obtained hydroxide in an amount of 0.196 mol and 0.204 mol of LiOH.H$_2$O were dispersed in ethanol to form a slurry, and the slurry was mixed for 40 minutes using a planetary ball mill and dried at room temperature to obtain a mixture. Subsequently, the mixture was placed in an alumina crucible, heated to 600° C. in a dry air flow of 2 dm$^3$/min, held at that temperature for two hours for preheating, and baked for 12 hours by increasing the temperature to 900° C. A lithium-containing composite oxide was thereby synthesized.

The obtained lithium-containing composite oxide was washed with water, heat treated in the atmospheric air (with an oxygen concentration of approximately 20 vol %) at 850° C. for 12 hours, and then pulverized into powder using a mortar, thereby obtaining an electrode active material. The obtained electrode active material was stored in a desiccator.

The electrode active material (lithium-containing composite oxide powder) was analyzed for its composition by an atomic absorption spectrometer, and was found to have a composition represented by $Li_{1.02}Ni_{0.60}Co_{0.20}Mn_{0.20}O_2$, (x=0.02, d=0.2, e=0.2 in the general compositional formula (2)).

In order to perform state analysis of the lithium-containing composite oxide, X-ray absorption spectroscopy (XAS) was performed using BL4 beam port of compact superconducting radiation source Aurora available from Sumitomo Electric Industries, Ltd. installed at the SR Center of Ritsumeikan University. The average valence of each of the elements included in the whole particles was measured by XAS using a transmission method, and the valence of each element on the particle surface was measured by an electron yield method. The obtained data was analyzed by using analysis software REX available from Rigaku Corporation based on Journal of the Electrochemical. Society 146, p 2799-2809 (1999).

Firstly, in order to determine the average valence of Ni in the whole lithium-containing composite oxide powder, state analysis similar to that performed on the lithium-containing composite oxide powder was performed using NiO and $LiNi_{0.5}Mn_{1.5}O_4$ (standard samples for compounds containing Ni having an average valence of 2) and $LiNi_{0.82}Co_{0.15}Al_{0.03}O_2$ (a standard sample for a compound containing Ni having an average valence of 3), and a regression line representing the relationship between the position of the K absorption edge of Ni and the valence of Ni was created for each standard sample.

The state analysis of the lithium-containing composite oxide powder found, from the position of the K absorption edge of Ni, that the average valence of Ni in the lithium-containing composite oxide was 2.72. Also, the measurement using an electron yield method found, from the position of the K absorption edge of Ni, that the valence of Ni on the powder surface of the lithium-containing composite oxide was 2.57.

The average valence of Co in the whole powder and the valence of Co on the powder surface were determined in the same manner as the average valence of Ni in the whole powder and the valence of Ni on the powder surface after creating a regression line similar to that created for Ni, using CoO (a standard sample for a compound containing Co having an average valence of 2) and $LiCoO_2$ (a standard sample for a compound containing Co having an average valence of 3).

The average valence of Mn in the whole powder and the valence of Mn on the powder surface were determined in the same manner as the average valence of Ni in the whole powder and the valence of Ni on the powder surface after creating a regression line similar to that created for Ni, using $MnO_2$ and $LiNi_{0.5}Mn_{1.5}O_4$ (standard samples for compounds containing Mn having an average valence of 4), $LiMn_2O_4$ (a standard sample for a compound containing Mn having an average valence of 3.5), $LiMnO_2$ and $Mn_2O_3$ (standard samples for compounds containing Mn having an average valence of 3) and MnO (a standard sample for a compound containing Mn having an average valence of 2.

Production of Positive Electrode

A positive electrode material mixture-containing paste was prepared by kneading 100 parts by mass of the above electrode active material, 20 parts by mass of an N-methyl-2-pyrrolidone (NMP) solution containing PVDF as a binder at a concentration of 10 mass %, 1 part by mass of artificial graphite as a conductive aid material and 1 part by mass of ketjen black with the use of a biaxial kneader and then adding NMP for viscosity adjustment.

The prepared positive electrode material mixture-containing paste was applied to both sides of a 15 μm thick aluminum foil (positive electrode current collector), and then vacuum-dried at 120° C. for 12 hours to form positive electrode material mixture layers on both sides of the aluminum foil. After that, pressing was performed to adjust the thickness and density of the positive electrode material mixture layers, a lead connector made of nickel was welded to an exposed portion of the aluminum foil, and a strip-shaped positive electrode having a length of 375 mm and a width of 43 mm was produced. In the obtained positive electrode, each positive electrode material mixture layer had a thickness of 55 μm.

Production of Negative Electrode

A negative electrode material mixture-containing paste was prepared by adding water to 97.5 parts by mass of natural graphite having a number average particle size of 10 μm as a negative electrode active material, 1.5 parts by mass of styrene butadiene rubber as a binder and 1 part by mass of carboxymethyl cellulose as a thickener and mixing them. The prepared negative electrode material mixture-containing paste was applied to both sides of a 8 μm thick copper foil, and then vacuum-dried at 120° C. for 12 hours to form negative electrode material mixture layers on both sides of the copper foil. After that, pressing was performed to adjust the thickness and density of the negative electrode material mixture layers, a lead connector made of nickel was welded to an exposed portion of the copper foil, and a strip-shaped negative electrode having a length of 380 mm and a width of 44 mm was produced. In the obtained negative electrode, each negative electrode material mixture layer had a thickness of 65 μm.

Preparation of Non-Aqueous Electrolyte

A non-aqueous electrolyte was prepared by dissolving $LiPF_6$ at a concentration of 1 mol/L in a solvent mixture of EC, MEC and DEC at a volume ratio of 2:3:1.

Assembly of Battery

The strip-shaped positive electrode was laminated on the strip-shaped negative electrode with a 16 μm thick microporous polyethylene separator (porosity: 41%) interposed therebetween, these were spirally wound and pressed into a flat shape to obtain a flat wound electrode assembly, and the obtained wound electrode assembly was fixed with polypropylene insulation tape. Next, the wound electrode assembly was inserted in a prismatic battery case made of an aluminum alloy having a thickness of 4.0 mm, a width of 34 mm and a height of 50 mm, lead connectors were welded, and a lid plate made of an aluminum alloy was welded to the opening edge of the battery case. After that, the non-aqueous electrolyte was injected from an inlet provided in the lid plate, and after standing one hour, the inlet was sealed to obtain a non-aqueous secondary battery having the structure shown in FIGS. 1A and 1B and the outer appearance shown in FIG. 2. The designed electrical capacity of the non-aqueous secondary battery was 1000 mAh.

Figure 1B:
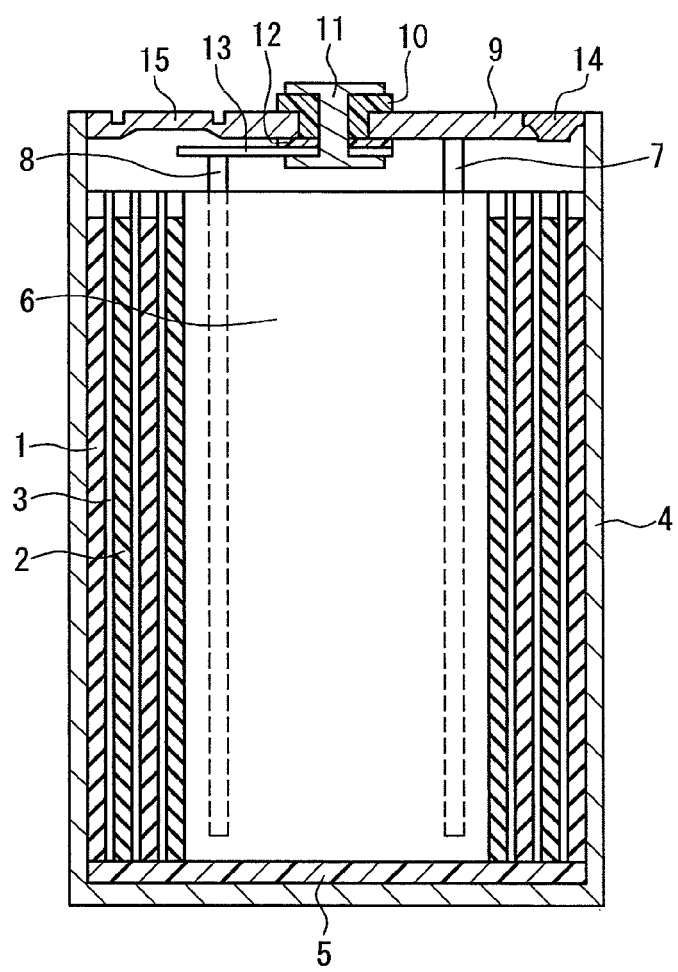
FIG. 1B is a cross-sectional view of FIG. 1A.

The battery shown in FIGS. 1A, 1B and 2 will be described here. FIG. 1A is a plan view, and FIG. 1B is a cross-sectional view of FIG. 1A. As shown in FIG. 1B, a positive electrode 1 and a negative electrode 2 are spirally wound with a separator 3 interposed therebetween, and then pressed into a flat shape to form a flat wound electrode assembly 6, and the electrode assembly 6 is housed in a rectangular cylindrical battery case 4 together with a non-aqueous electrolyte. In order to simplify the illustration of FIG. 1B, metal foils serving as current collectors used to produce the positive electrode 1 and the negative electrode 2 and the non-aqueous electrolyte are not illustrated.

The battery case 4 is a battery outer case made of an aluminum alloy, and the battery case 4 also serves as a positive electrode terminal. An insulator 5 made of a polyethylene sheet is placed on the bottom of the battery case 4, and a positive electrode lead connector 7 and a negative electrode lead connector 8 connected to the ends of the positive electrode 1 and the negative electrode 2, respectively, are drawn from the flat wound electrode assembly 6 including the positive electrode 1, the negative electrode 2 and the separator 3. A stainless steel terminal 11 is attached to a sealing lid plate 9 made of an aluminum alloy for sealing the opening of the battery case 4 with a polypropylene insulation packing 10 interposed therebetween, and a stainless steel lead plate 13 is attached to the terminal 11 with an insulator 12 interposed therebetween.

Then, the lid plate 9 is inserted into the opening of the battery case 4, the joint ortions of the lid plate 9 and the battery case 4 are welded to seal the opening the battery case 4, and thereby the interior of the battery is sealed. In the battery shown in FIGS. 1A and 1B, the lid plate 9 is provided with a non-aqueous electrolyte inlet 14, and the non-aqueous electrolyte inlet 14 is sealed by welding such as, for example, laser welding, with a sealing member inserted into the non-aqueous electrolyte inlet 14, and thereby the seal of the battery is ensured. Accordingly, in the battery shown in FIGS. 1A, 1B and 2, the non-aqueous electrolyte inlet 14 actually includes the non-aqueous electrolyte inlet and the sealing member, but in order to simplify the illustration, they are indicated as the non-aqueous electrolyte inlet 14. The lid plate 9 is also provided with a rupture vent 15 serving as a mechanism that discharges internal gas to the outside in the event of overheating of the battery In the battery of Example 1, the positive electrode lead connector 7 is welded directly to the lid plate 9, whereby the battery case 4 and the lid plate 9 function as a positive electrode terminal. Likewise, the negative electrode lead connector 8 is welded to the lead plate 13, and the negative electrode lead connector 8 and the terminal 11 are electrically connected via the lead plate 13, whereby the terminal 11 functions as a negative electrode terminal.

Figure 2:
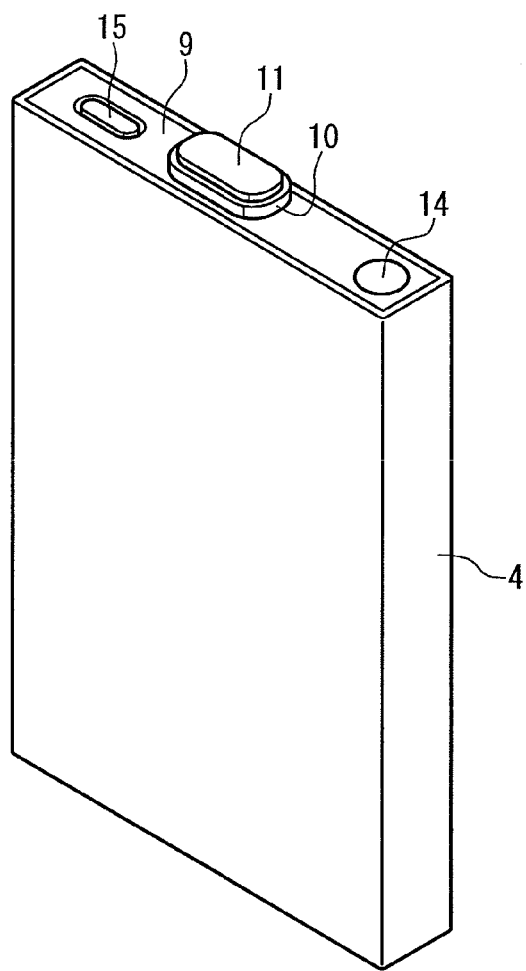
FIG. 2 is a perspective view of FIG. 1A.

FIG. 2 is a perspective view schematically showing the outer appearance of the battery shown in FIG. 1A, and FIG. 2 is illustrated to indicate that the battery is a prismatic battery. FIG. 2 schematically shows the battery, and thus only specific constituent elements of the battery are shown. Similarly, in FIG. 1B, the innermost portion of the electrode assembly is not shown in cross section.

Example 2

An electrode active material (lithium-containing composite oxide) was produced in the same manner as in Example 1, except that a hydroxide containing Ni, Co and Mn at a molar ratio of 6:3:1 was synthesized by adjusting the concentrations of the raw material compounds of the mixed aqueous solution used to synthesize the coprecipitated compound, and the synthesized hydroxide was used. Furthermore, a positive electrode and a non-aqueous secondary battery were produced in the same manner as in Example 1, except that the produced electrode active material was used.

Example 3

An electrode active material (lithium-containing composite oxide) was produced in the same manner as in Example 1, except that a hydroxide containing Ni, Co and Mn at a molar ratio of 6:1:3 was synthesized by adjusting the concentrations of the raw material compounds of the mixed aqueous solution used to synthesize the coprecipitated compound, and the synthesized hydroxide was used. Furthermore, a positive electrode and a non-aqueous secondary battery were produced in the same manner as in Example 1, except that the produced electrode active material was used.

Example 4

An electrode active material (lithium-containing composite oxide) was produced in the same manner as in Example 1, except that a hydroxide containing Ni, Co and Mn at a molar ratio of 5.5:1.5:3 was synthesized by adjusting the concentrations of the raw material compounds of the mixed aqueous solution used to synthesize the coprecipitated compound, and the synthesized hydroxide was used. Furthermore, a positive electrode and a non-aqueous secondary battery were produced in the same manner as in Example 1, except that the produced electrode active material was used.

Example 5

An electrode active material (lithium-containing composite oxide) was produced in the same manner as in Example 1, except that a hydroxide containing Ni, Co and Mn at a molar ratio of 5.5:2:2.5 was synthesized by adjusting the concentrations of the raw material compounds of the mixed aqueous solution used to synthesize the coprecipitated compound, and the synthesized hydroxide was used. Furthermore, a positive electrode and a non-aqueous secondary battery were produced in the same manner as in Example 1, except that the produced electrode active material was used.

Example 6

An electrode active material (lithium-containing composite oxide) was produced in the same manner as in Example 1, except that a hydroxide containing Ni, Co and Mn at a molar ratio of 5:2:3 was synthesized by adjusting the concentrations of the raw material compounds of the mixed aqueous solution used to synthesize the coprecipitated compound, and the synthesized hydroxide was used. Furthermore, a positive electrode and a non-aqueous secondary battery were produced in the same manner as in Example 1, except that the produced electrode active material was used.

Example 7

An electrode active material (lithium-containing composite oxide) was produced in the same manner as in Example 1, except that a hydroxide containing Ni, Co and Mn at a molar ratio of 5:3:2 was synthesized by adjusting the concentrations of the raw material compounds of the mixed aqueous solution used to synthesize the coprecipitated compound, and the synthesized hydroxide was used. Furthermore, a positive electrode and a non-aqueous secondary battery were produced in the same manner as in Example 1, except that the produced electrode active material was used.

Comparative Example 1

An electrode active material (lithium-containing composite oxide) was produced in the same manner as in Example 1, except that the water washing after baking and the heat treatment were not performed, and a positive electrode and a non-aqueous secondary battery were produced in the same manner as in Example 1, except that the produced electrode active material was used.

Comparative Example 2

An electrode active material (lithium-containing composite oxide) was produced in the same manner as in Example 2, except that the water washing after baking and the heat treatment were not performed, and a positive electrode and a non-aqueous secondary battery were produced in the same manner as in Example 2, except that the produced electrode active material was used.

Comparative Example 3

An electrode active material (lithium-containing composite oxide) was produced in the same manner as in Example 1, except that the heat treatment after water washing was performed in a nitrogen atmosphere, or in other words, in an oxygen-free atmosphere, and a positive electrode and a non-aqueous secondary battery were produced in the same manner as in Example 1, except that the produced electrode active material was used.

Comparative Example 4

An electrode active material (lithium-containing composite oxide) was produced in the same manner as in Example 2, except that the temperature of the heat treatment after water washing was set to 500° C., and a positive electrode and a non-aqueous secondary battery were produced in the same manner as in Example 1, except that the produced electrode active material was used.

Comparative Example 5

An electrode active material (lithium-containing composite oxide) was produced in the same manner as in Example 1, except that the temperature of the heat treatment after water washing was set to 1100° C., and a positive electrode and a non-aqueous secondary battery were produced in the same manner as in Example 1, except that the produced electrode active material was used.

Comparative Example 6

A positive electrode and a non-aqueous secondary battery were produced in the same manner as in Example 1, except that commercially available $Li_{1.02}Ni_{0.80}Co_{0.15}Al_{0.05}O_2$ was used as an active material.

Composition, average valence of each of Ni, Co and Mn in the whole powder and valence of each of Ni, Co and Mn on the powder surface were determined for the electrode active materials of Examples 2 to 7 and Comparative Examples 1 to 6 in the same manner as in Example 1. Table 1 shows the compositions of the electrode active materials (lithium-containing composite oxides) produced in Examples 1 to 7 and Comparative Examples 1 to 6. Table 2 shows the average valence of each of Ni, Co and Mn in the whole powder and the valence of each of Ni, Co and Mn on the powder surface for the electrode active materials (lithium-containing composite oxides) produced in Examples 1 to 7 and Comparative Examples 1 to 6.

TABLE 1

| | Composition of lithium-containing composite oxide | | | |
|---|---|---|---|---|
| | Compositional formula | x | a | b | c |
| Ex. 1 | $Li_{1.02}Ni_{0.60}Co_{0.20}Mn_{0.20}O_2$ | 0.02 | 60 | 20 | 20 |
| Ex. 2 | $Li_{1.02}Ni_{0.60}Co_{0.30}Mn_{0.10}O_2$ | 0.02 | 60 | 30 | 10 |
| Ex. 3 | $Li_{1.02}Ni_{0.60}Co_{0.10}Mn_{0.30}O_2$ | 0.02 | 60 | 10 | 30 |
| Ex. 4 | $Li_{1.02}Ni_{0.55}Co_{0.15}Mn_{0.30}O_2$ | 0.02 | 55 | 15 | 30 |
| Ex. 5 | $Li_{1.02}Ni_{0.55}Co_{0.20}Mn_{0.25}O_2$ | 0.02 | 55 | 20 | 25 |
| Ex. 6 | $Li_{1.02}Ni_{0.50}Co_{0.20}Mn_{0.30}O_2$ | 0.02 | 50 | 20 | 30 |
| Ex. 7 | $Li_{1.02}Ni_{0.50}Co_{0.30}Mn_{0.20}O_2$ | 0.02 | 50 | 30 | 20 |
| Comp. Ex. 1 | $Li_{1.02}Ni_{0.60}Co_{0.20}Mn_{0.20}O_2$ | 0.02 | 60 | 20 | 20 |
| Comp. Ex. 2 | $Li_{1.02}Ni_{0.60}Co_{0.30}Mn_{0.10}O_2$ | 0.02 | 60 | 30 | 10 |
| Comp. Ex. 3 | $Li_{0.92}Ni_{0.60}Co_{0.20}Mn_{0.20}O_{1.8}$ | −0.08 | 60 | 20 | 20 |
| Comp. Ex. 4 | $Li_{1.02}Ni_{0.60}Co_{0.30}Mn_{0.10}O_2$ | 0.02 | 60 | 30 | 10 |
| Comp. Ex. 5 | $Li_{0.88}Ni_{0.60}Co_{0.20}Mn_{0.20}O_2$ | −0.12 | 60 | 20 | 20 |
| Comp. Ex. 6 | $Li_{1.02}Ni_{0.80}Co_{0.15}Al_{0.05}O_2$ | 0.02 | 80 | 15 | — |

In Table 1, x in the composition of lithium-containing composite oxide represents x in the general compositional formulas (1) and (2). Similarly, a, b and c respectively represent the ratios (mol %) of Ni, Co and Mn based on the total amount of the element group M taken as 100 mol %. The units are omitted in Table 1.

the thickness after storage of each battery obtained in the above-described manner and the thickness before storage (4.0 mm).

TABLE 2

|  | Ni valence | | Co valence | | Mn valence | |
| --- | --- | --- | --- | --- | --- | --- |
|  | Average valence | Valence on powder surface | Average valence | Valence on powder surface | Average valence | Valence on powder surface |
| Ex. 1 | 2.72 | 2.57 | 2.79 | 2.65 | 4.07 | 4.05 |
| Ex. 2 | 2.73 | 2.59 | 2.74 | 2.60 | 4.07 | 4.05 |
| Ex. 3 | 2.53 | 2.40 | 2.78 | 2.55 | 4.07 | 4.05 |
| Ex. 4 | 2.48 | 2.38 | 2.78 | 2.55 | 4.07 | 4.05 |
| Ex. 5 | 2.64 | 2.51 | 2.88 | 2.65 | 4.07 | 4.05 |
| Ex. 6 | 2.40 | 2.16 | 2.76 | 2.55 | 4.07 | 4.05 |
| Ex. 7 | 2.62 | 2.56 | 2.80 | 2.65 | 4.07 | 4.05 |
| Comp. Ex. 1 | 2.72 | 2.59 | 2.79 | 3.12 | 4.07 | 4.05 |
| Comp. Ex. 2 | 2.73 | 2.61 | 2.74 | 3.08 | 4.07 | 4.05 |
| Comp. Ex. 3 | 2.52 | 2.55 | 2.61 | 2.64 | 3.72 | 3.74 |
| Comp. Ex. 4 | 2.72 | 2.70 | 2.79 | 2.91 | 4.07 | 4.05 |
| Comp. Ex. 5 | 2.61 | 2.60 | 2.70 | 2.72 | 4.07 | 4.05 |
| Comp. Ex. 6 | 3.00 | 2.90 | 3.05 | 3.01 | — | — |

The non-aqueous secondary batteries of Examples 1 to 7 and Comparative Examples 1 to 6 were subjected to the following evaluations. The results are shown in Table 3.

Capacity Measurement

Each of the batteries of Examples 1 to 7 and Comparative Examples 1 to 6 was stored at 60° C. for 7 hours, and thereafter a charge/discharge cycle in which the battery was charged at a current value of 200 mA for 5 hours and discharged at a current value of 200 mA to a battery voltage of 3 V was repeated at 20° C. until the discharge capacity became constant. Subsequently, constant current-constant voltage charge (constant current: 500 mA, constant voltage: 4.2 V, total charge time: 3 hours) was performed, after a rest period of one hour, the battery was discharged at a current value of 200 mA to a battery voltage of 3 V, and standard capacity was determined. For each of the examples and comparative examples, 100 batteries were measured and the average value was taken as the standard capacity of the example or comparative example.

Charge/Discharge Cycle Characteristics

Each of the batteries of Examples 1 to 7 and Comparative Examples 1 to 6 was subjected to repeated charge/discharge cycles in which constant current-constant voltage charge was performed under the same conditions as those for the standard capacity measurement, and after a rest period of one minute, discharge was performed at a current value of 200 mA to a battery voltage of 3 V, so as to obtain the number of cycles at which the discharge capacity decreased to 70% of the initial discharge capacity, and thereby the charge/discharge cycle characteristics of each battery was evaluated. The number of cycles mentioned in the description of charge/discharge cycle characteristics was measured for 10 batteries for each of the examples and comparative examples, and the average value was taken as the number of cycles of the example or comparative example.

Storage Characteristics

Each of the batteries of Examples 1 to 7 and Comparative Examples 1 to 6 was subjected to constant current-constant voltage charge (constant current: 400 mA, constant voltage: 4.25 V, total charge time: 3 hours), and then was placed and allowed to sit in a constant temperature chamber at 80° C. for 5 days. Then, the thickness of the battery was measured. Storage characteristics were evaluated based on the battery bulge during storage determined by the difference between the thickness after storage of each battery obtained in the above-described manner and the thickness before storage (4.0 mm).

Safety Evaluation

Each of the batteries of Examples 1 to 7 and Comparative Examples 1 to 6 was subjected to constant current-constant voltage charge (constant current: 1000 mA, constant voltage: 4.25 V, total charge time: 3 hours), thereafter the battery was placed in a constant temperature chamber, after a rest period of two hours, the temperature was increased from 30° C. to 170° C. at a rate of 5° C. per minute, the battery was subsequently allowed to sit at 170° C. for 3 hours, and then the surface temperature of the battery was measured. Batteries with a highest battery surface temperature of 180° C. or less were rated as A, and batteries with a highest battery surface temperature exceeding 180° C. were rated as B.

TABLE 3

|  | Standard capacity (mAh) | Number of cycles (times) | Battery bulge during storage | Safety |
| --- | --- | --- | --- | --- |
| Ex. 1 | 987 | 540 | 0.70 | A |
| Ex. 2 | 980 | 550 | 0.72 | A |
| Ex. 3 | 955 | 520 | 0.80 | A |
| Ex. 4 | 934 | 600 | 0.65 | A |
| Ex. 5 | 940 | 580 | 0.54 | A |
| Ex. 6 | 900 | 640 | 0.45 | A |
| Ex. 7 | 920 | 620 | 0.40 | A |
| Comp. Ex. 1 | 978 | 426 | 1.24 | A |
| Comp. Ex. 2 | 974 | 443 | 1.26 | A |
| Comp. Ex. 3 | 448 | 125 | 1.60 | A |
| Comp. Ex. 4 | 968 | 467 | 1.07 | A |
| Comp. Ex. 5 | 636 | 321 | 1.16 | A |
| Comp. Ex. 6 | 971 | 473 | 1.12 | B |

The non-aqueous secondary batteries of Examples 1 to 7, which had a positive electrode using, as an active material, a lithium-containing composite oxide in which the average valences of Ni, Co and Mn in the whole powder were optimal, and the valences of Ni and Co on the powder surface were smaller than the average Ni valence and the average Co valence, exhibited a large standard capacity, excellent safety, good charge/discharge cycle characteristics and storage characteristics.

In contrast, the non-aqueous secondary batteries of Comparative Examples 1, 2, 4 and 5, which had a positive electrode using, as an active material, a lithium-containing composite oxide in which the valence of Co on the powder surface was higher than the average valence of Co in the whole powder, exhibited poor charge/discharge cycle characteristics and storage characteristics, and the non-aqueous secondary battery of Comparative Example 5 also exhibited a small standard capacity. The non-aqueous secondary battery of Comparative Example 3, which had a positive electrode using, as an active material, a lithium-containing composite oxide in which the valences of Ni and Co on the powder surface were higher than the average valence of Ni and the average valence of Co in the whole powder, exhibited a small standard capacity, and poor charge/discharge cycle characteristics and storage characteristics. Furthermore, the non-aqueous secondary battery of Comparative Example 6, which had a positive electrode using, as an active material, commercially available $Li_{1.02}Ni_{0.80}Co_{0.15}Al_{0.05}O_2$ and containing no Mn, exhibited poor charge/discharge cycle characteristics, storage characteristics and safety.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

According to the present invention, it is possible to provide a non-aqueous secondary battery that has a high capacity, good safety even in high temperature environments, and excellent charge/discharge cycle characteristics and storage characteristics. The non-aqueous secondary battery of the present invention can be used in applications such as power sources for various electronic devices including portable electronic devices such as cell phones and notebook personal computers, and can also be used in applications that require safety such as electric tools, automobiles, bicycles and power storages.

DESCRIPTION OF REFERENCE NUMERALS

1 Positive Electrode
2 Negative Electrode
3 Separator

The invention claimed is:

1. An electrode active material comprising particles of a lithium-containing composite oxide represented by the general compositional formula:

$$Li_{1+x}MO_2,$$

where x is within a range of $-0.05 \le x \le 0.15$, and M represents an element group of three or more elements including at least Ni, Co and Mn,
wherein the ratios of Ni, Co and Mn to the total elements constituting M satisfy $45 \le a \le 60$, $5 \le b \le 30$, $5 \le c \le 30$ and $10 \le b+c \le 55$, where the ratios of Ni, Co and Mn are represented by a, b and c, respectively, in units of mol%,
the average valence A of Ni in the whole particles is 2.2 to 3.2, the valence B of Ni on the surface of the particles has the relationship: B<A,
the average valence C of Co in the whole particles is 2.5 to 3.2, the valence D of Co on the surface of the particles has the relationship: D≤C, and
the average valence of Mn in the whole particles is 3.5 to 4.2.

2. The electrode active material according to claim 1, wherein the average valence A of Ni in the whole particles is 2.2 to 2.9, and the valence B of Ni on the surface of the particles has the relationship: B≤A.

3. The electrode active material according to claim 1, wherein the ratio b of Co and the ratio c of Mn have the relationship: b>c.

4. The electrode active material according to claim 1, wherein the ratio b of Co and the ratio c of Mn have the relationship: b≤c.

5. The electrode active material according to claim 1, wherein the lithium-containing composite oxide is represented by the general compositional formula: $Li_{1+x}Ni_{1-d-e}Co_dMn_eO_2$, where $-0.15 \le x \le 0.15$, $0.05 \le d \le 0.3$, $0.05 \le e \le 0.3$, and $0.1 \le d+e \le 0.55$.

6. The electrode active material according to claim 1, wherein the lithium-containing composite oxide is formed by washing a composite oxide of Li and the element group M with water or an organic solvent, heat treating the washed composite oxide at a temperature of 600 to 1000° C. in an atmosphere containing 18 vol% or more of oxygen, and pulverizing the composite oxide.

7. The electrode active material according to claim 1, wherein the particles of the lithium-containing composite oxide have a true density of 4.55 to 4.95 g/cm³.

8. The electrode active material according to claim 1, wherein in the particles of the lithium-containing composite oxide, the ratio of primary particles having a particle size of 1 μm or less to the total primary particles of the lithium-containing composite oxide particles is 30 vol% or less.

9. The electrode active material according to claim 1, wherein the lithium-containing composite oxide has a BET specific surface area of 0.1 to 0.3 m²/g.

10. The electrode active material according to claim 1, wherein the particles of the lithium-containing composite oxide has a spherical shape.

11. An electrode for a non-aqueous secondary battery comprising an electrode material mixture layer containing the electrode active material according to claim 1, wherein the electrode material mixture layer has a density of 3.2 to 3.8 g/cm³.

12. The electrode for a non-aqueous secondary battery according to claim 11, wherein the electrode material mixture layer has a density of 3.5 to 3.8 g/cm³.

13. A non-aqueous secondary battery comprising a positive electrode, a negative electrode and a non-aqueous electrolyte,
wherein the positive electrode is the electrode for a non-aqueous secondary battery according to claim 11.

14. The electrode active material according to claim 1, wherein the valence D of Co on the surface of the particles is 2.65 or less.

* * * * *